United States Patent [19]

Kollross

[11] 4,377,885
[45] Mar. 29, 1983

[54] SHAFTLESS GEAR DEVICE FOR AXIAL SHIRRING OF SYNTHETIC TUBULAR MATERIAL

[76] Inventor: Gunter Kollross, Am Wallerstadter Weg 20, D-6081 Dornheim, Fed. Rep. of Germany

[21] Appl. No.: 267,655

[22] Filed: May 27, 1981

[30] Foreign Application Priority Data

May 31, 1980 [DE] Fed. Rep. of Germany ....... 3020734

[51] Int. Cl.³ ............................................. A22C 13/02
[52] U.S. Cl. ....................................................... 17/42
[58] Field of Search ...................... 17/1 R, 1 F, 41, 42

[56] References Cited

U.S. PATENT DOCUMENTS

| | | | |
|---|---|---|---|
| 2,984,574 | 5/1961 | Matecki | 17/42 X |
| 3,142,861 | 8/1964 | Riegler | 17/42 |
| 4,176,204 | 11/1979 | Winkler | 17/42 X |

FOREIGN PATENT DOCUMENTS 2912474  10/1980  Fed. Rep. of Germany .......... 17/41

*Primary Examiner*—Willie G. Abercrombie
*Attorney, Agent, or Firm*—Larson and Taylor

[57] ABSTRACT

A device for axial shirring of synthetic tubular material by forming a continuous helical fold. As the unshirred tubular material moves along a mandrel, it is engaged by the teeth of four shirring rolls having their axes located in a plane transverse to the mandrel axis. This assembly of shirring rolls revolves about the mandrel axis, and the shirring rolls are interconnected for timed rotation with each other and preferably they are all driven from the assembly revolving drive means. Each of the shirring rolls is mounted on a shaft which is non-rotatably fixed to the revolving holding member, and each shirring roll is in turn rotatably mounted via bearing means on its respective shaft. Pairs of tapered gears are fixed to the sides of the shirring rolls for rotation therewith about their respective fixed shafts. A first one of these tapered gears is driven by a drive means while the tapered gears between the remaining shirring rolls mesh to carry the driving force to the other shirring rolls.

6 Claims, 2 Drawing Figures

SHAFTLESS GEAR DEVICE FOR AXIAL SHIRRING OF SYNTHETIC TUBULAR MATERIAL

This invention relates to a device for axial shirring of tubular material, especially for the manufacture of sausages or the like, on an elongated overhanging mandrel with four toothed shirring rolls distributed about the periphery of the mandrel and advancing the tubular material against a stop on the mandrel, to form folds, said toothed shirring rolls being mounted on a holding member concentric to the axis of the mandrel, the shirring rolls being drivingly connected to one another by three pairs of tapered gears. The shirring rolls have such a diameter that their teeth, having arcuate concave grooves such as semicircular recesses, engage the mandrel overlapping in the zone of engagement of the teeth, and the holding member in turn is rotatably mounted on a frame to revolve about the mandrel axis. Furthermore, means are provided for driving the holding member and the shirring rolls according to my copending patent application Ser. No. 204,167, filed Nov. 5, 1980.

In an example of an embodiment described and illustrated in said copending application, the shirring rolls are fixed on shafts that are mounted in bearing blocks on the rotatable holding member in the immediate vicinity of the shirring rolls, and at their free ends the tapered gears are mounted for mutual driving connection. In the preferred arrangement using four shirring rolls distributed by 90° about the periphery of the mandrel, the minimum permissible diameter of the gears leads to relatively large shirring rolls diameters, which in the case of large caliber tubular material to be shirred in turn leads to an extraordinarily large total diameter of the shirring head formed by the shirring rolls and the holding member. As a result, not only are the overall dimensions of the holding member undesirably large in the radial direction, but also the drive and the bearings of the shirring head must be correspondingly large, with respect to both weight and inertial mass.

The present invention therefore basically relates to the problem of producing a device of the type in question, even for large calibers of the tubular material to be processed, wherein the diameter, weight and inertial mass of the shirring head can be comparatively small.

According to the present invention, this problem is solved in that the shirring rolls are shaftlessly and directly connected with the tapered gears, and the shirring rolls, with their tapered gears fixed thereto, are mounted on non-rotatable shafts which are fixed to the holding member at points located axially out beyond the tapered gears.

Thus, by means of the present invention, the axial distance of the tapered gears from the longitudinal center plane of the appurtenant shirring roll can be shortened, despite the necessary minimal width of the shirring rolls themselves. This in turn has the effect that the axes of rotation of the shirring rolls can be set closer to the center of rotation of the holding member and consequently the shirring rolls can have a smaller diameter. It is apparent that not only the dimensions but also the weight and the inertial mass of the shirring head constituted by the shirring rolls and their holding member can be substantially reduced, as compared to those of the embodiment in my said copending application.

While the holding member is always driven directly by an external drive device, e.g. a belt drive, the drive for the shirring wheels, as known for example from German OS 24 03 470, can occur by means of a special drive device, directly, or it can be taken from the rotational movement of the holding member, for which, in the example of embodiment in my said copending application there is the provision of an annular toothing on the bearing frame, in whose wormlike threads there engages a worm gear mounted perpendicularly to the axis of rotation of the holding member, from which worm gear the movement of rotation deriving from the rotation of the holding member is transmitted via a toothed belt drive to the shaft of a shirring roll.

The relatively great imbalance of the drive means which drives the shirring rolls and the danger that the belt will break as a result of fatigue is prevented by an advantageous arrangement according to the present invention, in that the annular toothing is a conventional spur toothing and the drive means disposed on the holding member is another pair of tapered gears, wherein one gear is connected shaftlessly with one shirring roll and the other gear is seated on a shaft parallel to the axis of rotation of the holding member, which shaft additionally includes a spur gear which meshes with the annular toothing. Since even this additional pair of tapered gears presents only a relatively slight distance to the axis of rotation of the holding member, the imbalance produced by this drive means is slight and can be readily managed, e.g. by counterweights. The annular toothing on the bearing frame has a correspondingly small diameter and, as an ordinary spur gear, it is lighter and cheaper to manufacture, like the spur gear that it engages, than would be the case with a worm drive. The smaller diameter of the annular toothing moreover approaches the rpm ratio sought for in the said copending application, between the shirring rolls and the holding member, between 2:1 and 1:2, which may possibly be still further corrected by making the additional pair of tapered gears as a reduction gear.

The invention will now be described with respect to an illustrated, preferred embodiment which will be described in detail in conjunction with the following drawings wherein.

Referring now to the drawings, like elements are represented by like numerals throughout the several views.

Figure 1:
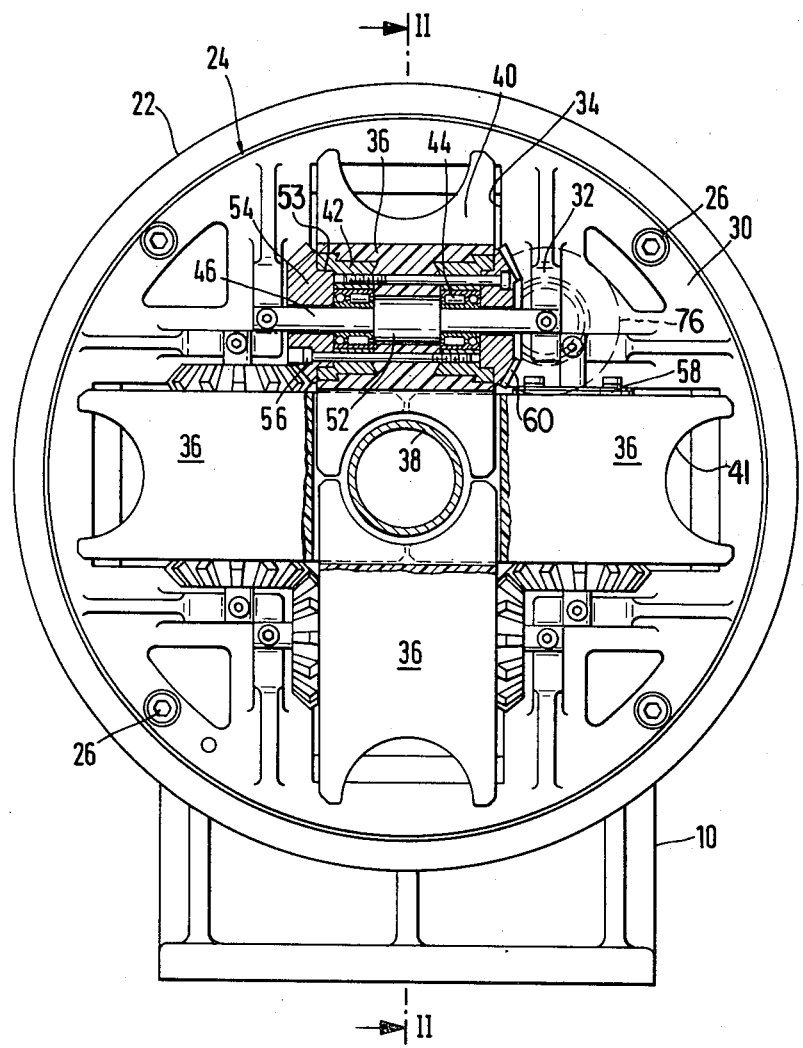
FIG. 1 is a frontal view of a device made in accordance with the present invention, with a part shown in section to illustrate the bearing of a shirring roll.
Figure 2:
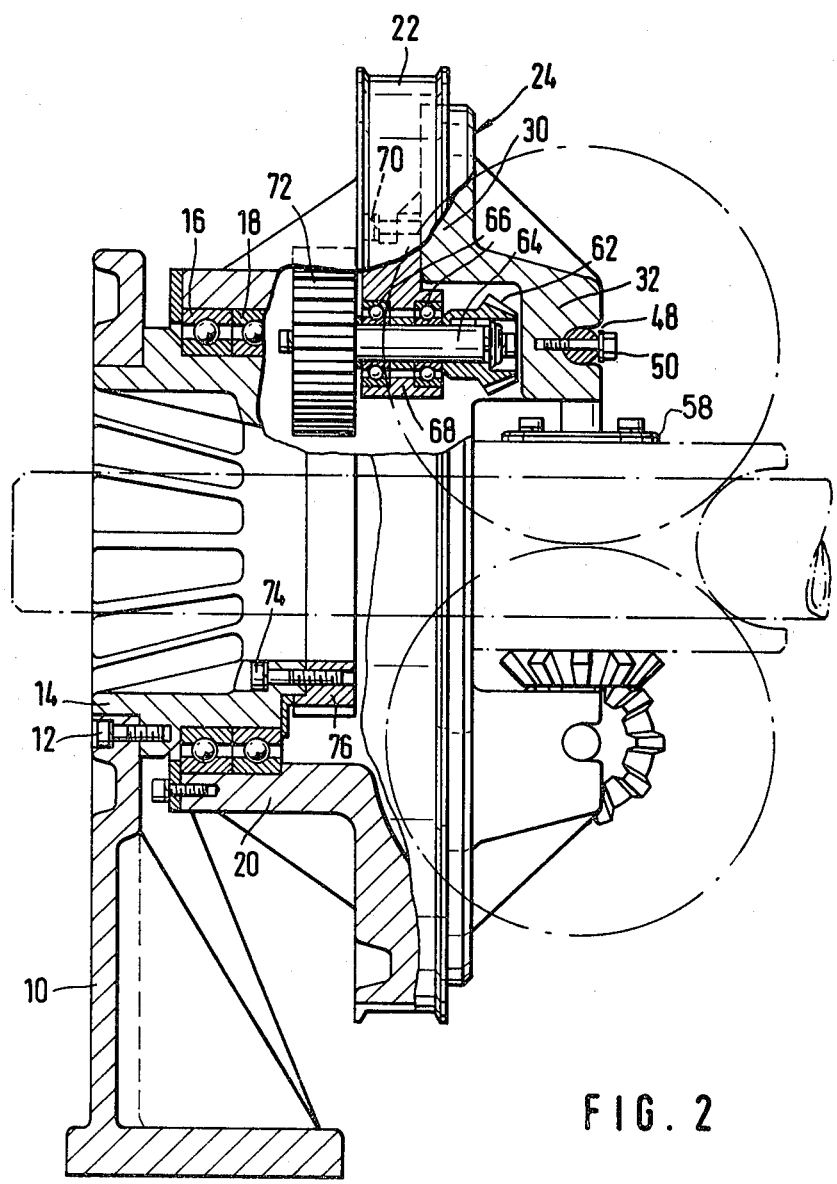
FIG. 2 is essentially a longitudinal sectional view taken along line II—II of FIG. 1, with the upper right hand portion comprising a partial sectional view through the drive mechanism, and with the lower right hand portion showing a side elevational view, as viewed from the left hand side of FIG. 1.

As shown in FIGS. 1 and 2, a bearing sleeve 14 is fixed to a bearing frame 10 by means of bolts 12, on which sleeve a sleevelike shaft 20 is rotatably mounted by means of ball bearings 16, 18. The sleevelike shaft 20 bears integrally a pulley 22, to which an annular holding member 24 is fastened, e.g. by bolts 26.

Holding member 24 comprises a plate part 30 with bearing block projections 32 placed integrally thereon, between which projections recesses 34 in cruciform arrangement are provided to receive four shirring rolls 36 that are disposed like a star about a tubular shirring mandrel 38 which extends in a manner known per se coaxially through the holding member.

The shirring rolls 36 are preferably of synthetic rubber or other plastic material and, as FIG. 2 shows, the teeth 40 are furnished at their periphery with concave arcuate grooves in the form of semicircular recesses 41 which are staggered with respect to each other on the four shirring rolls in such a way that they successively overlap in the zone of engagement with shirring mandrel 38.

Each shirring roll 36 is provided on its sides with a pair of opposed recesses in which bearing sleeves 42 are introduced. Bearing sleeves 42 receive combined needle/ball bearings 44 on which the shirring rolls 36 are mounted on shafts 46 whose ends engage in jaw openings 48 of projections 32 and are fixed therein by bolts 50. Shafts 46 are moreover cylindrically thickened in the longitudinal center at 52, to form stops for the inner rings of bearing 44. The bearing sleeves 42 are provided with recesses on the opposed sides facing away from each other, in which recesses the cylindrical inward projections 53 of tapered gears 54 engage. Each gear 54 is clamped to its respective bearing sleeve 42 by a trio of bolts 56 distributed on the periphery, on the respective opposing bearing sleeves 42.

The angle of taper of gears 54 is 45°. In toto, there are six such tapered gears 54 which constitute the three pairs of tapered gears for driving connection of the four shirring rolls 36 with a rotation ratio of 1:1. The right-hand shirring roll 36 of FIG. 1 is provided with only one tapered gear 54, which is located on its underside, whereas on its upper side there is only a pressure plate 58. Similarly the upper shirring roll of FIG. 1 has only one tapered gear 54 having a taper angle of 45°, that gear being located on its left side, whereas on the right side there is fastened a tapered gear 60 with an angle of taper of 60°. This gear 60 meshes with a tapered gear 62 (FIG. 2) to constitute a reduction gear, said gear 62 having a taper angle of only 30°. Gear 62 is seated on the forward end of a shaft 64 which is parallel to the axis of rotation of holding member 24, said shaft 64 being mounted in a bearing part 68 by ball bearings 66, fixed by bolts 70 in a recess of pulley 22. The other end of shaft 64 presents a toothed gear 72 which meshes with toothed annular gear 76 fixed to bearing sleeve 14 by bolts 74.

Holding member 24 is driven in a known way by means of pulley 22 by an electric motor (not illustrated), which may be adjustable, via a belt drive. FIG. 2 shows the diameter of toothed annular gear 76 is twice as large as that of toothed gear 72. With one rotation of holding member 24 about its axis, therefore, toothed gear 72 executes two rotations with respect to holding member 24. As mentioned above, tapered gear 62 has an angle of taper of 30°, while the angle of taper gear 60 which meshes with it is 60°. The drive constituted by these two tapered gears consequently has a reduction of 1:2 which compensates the excess in rotation of gear 72 with respect to the rotation of holding member 24 of 2:1. Since the shirring roll 36 which is directly driven by tapered gear 60 is in driving connection via gears 54 with the other shirring rolls in a ratio of 1:1, all shirring rolls 36 will turn at the same rpm with which holding member 24 revolves about its axis. Assuming that each shirring roll 36 has ten teeth 40, with one rotation of holding member 24 there will consequently be produced a helicoidal shirring fold with ten windings.

It is clear that the shaftless arrangement of the shirring rolls 36 and their bearings on non-ratatable shafts 46 fixed to the holding member 24 at their ends makes possible the direct connection of the tapered gears 54 on the sides of the shirring rolls 36 which in turn has the result that the shirring roll diameter can be selected so as to be relatively small without going below a minimum required size for gears 54 or 60. The whole shirring head which comprises the holding member 24, shirring rolls 36 and the elements that bear and connect them can therefore be made of a corresponding small diameter, and a correspondingly smaller diameter of the pulley 22 is permitted. Thereby the weight and the inertial moment of the shirring head can be kept small, which facilitates the acceleration and braking at the start or end of the specific shirring process and allows use of a smaller drive motor.

Although the invention has been described in considerable detail with respect to preferred embodiments thereof, it will be apparent that the invention is capable of numerous modifications and variations, apparent to those skilled in the art, without departing from the spirit and scope of the invention, as defined in the claims.

I claim:

1. A device for axial shirring of synthetic tubular material, such as for use on an automated sausage stuffer, comprising:

at least four shirring rolls rotatable about axes, all of which axes are located in a common plane, the shirring rolls being distributed equally angularly about a central opening adapted to receive a cylindrical mandrel, such that the periphery of the rolls all include a portion facing the mandrel and the said common plane of the axes is transverse to the axis of the mandrel, means including a holding member for mounting the assembly for revolving movement about the mandrel, each of said shirring rolls having a plurality of teeth, the outer end of each tooth including a concave arcuate groove, the curvature of which groove corresponds to the surface of the mandrel which it faces, the path of the grooves of the teeth of each shirring roll, as they pass closest to the mandrel, overlapping the path of the grooves of the teeth of the two adjacent shirring rolls, when viewed along the axis of the mandrel, a shaft for each shirring roll located at the axis of its shirring roll, each such shaft being fixedly connected to the holding member with its respective shirring roll mounted thereon via bearing means for rotation relative thereto, tapered gears fixed to the sides of at least some of said shirring rolls for rotation therewith about their respective shafts, and said tapered gears being co-axial with their respective shirring rolls, at least some of the adjacent pairs of tapered gears between adjacent shirring rolls meshing with each other to provide a driving connection from one of said shirring rolls to the adjacent shirring roll, and a roll drive means for rotating at least one of said shirring rolls about its axis, the driving force being conveyed to other shirring rolls via said meshing adjacent tapered gears.

2. A device according to claim 1, the said roll drive means being connected to the holding member to be rotated by revolving movement of the holding member.

3. A device according to claim 2, said drive means comprising a tapered drive gear engaged with a said tapered gear on a first one of the shirring rolls, and including a pair of adjacent meshing tapered gears between the remaining shirring rolls, whereby the driving force is conveyed via the meshing tapered gears to the other three shirring rolls.

4. A device according to claim 3, the taper of the tapered drive gear being greater than the taper of the gear which it engages to thus provide a speed reduction therebetween.

5. A device according to any one of claims 1-4, the angle of taper of the adjacent meshing tapered gears being 45°.

6. A device according to any one of claims 2-4, the tapered drive gear having a spur gear fixed thereto and coaxial therewith, the said spur gear meshing with a toothed annular gear which is fixed to the holding member.

* * * * *